United States Patent [19]

Kitagawa et al.

[11] 4,285,036

[45] Aug. 18, 1981

[54] DATA PROCESSING DEVICE USING A SUBROUTINE CALL INSTRUCTION

[75] Inventors: Yukio Kitagawa, Yokohama; Yoshiaki Moriya, Inagi, both of Japan

[73] Assignee: Tokyo Shibaura Denki Kabushiki Kaisha, Japan

[21] Appl. No.: 5,212

[22] Filed: Jan. 22, 1979

[30] Foreign Application Priority Data

Feb. 2, 1978 [JP] Japan ................................. 53/10930

[51] Int. Cl.³ .............................................. G06F 9/40
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,593,313 | 7/1971 | Thomaszewski | 364/200 |
| 3,938,098 | 2/1976 | Garlic | 364/200 |

Primary Examiner—Raulfe B. Zache
Attorney, Agent, or Firm—Finnegan, Henderson, Farabow, Garrett & Dunner

[57] ABSTRACT

An instruction outputted from an instruction register is decoded by an instruction decoder. In the instructions decoded by said instruction decoder, a subroutine call instruction of which the address field is coded is applied to a data converter of which the address field is connected to said instruction register. The data converter decodes the inputted and coded address to produce a given effective address.

8 Claims, 4 Drawing Figures

F I G. 2
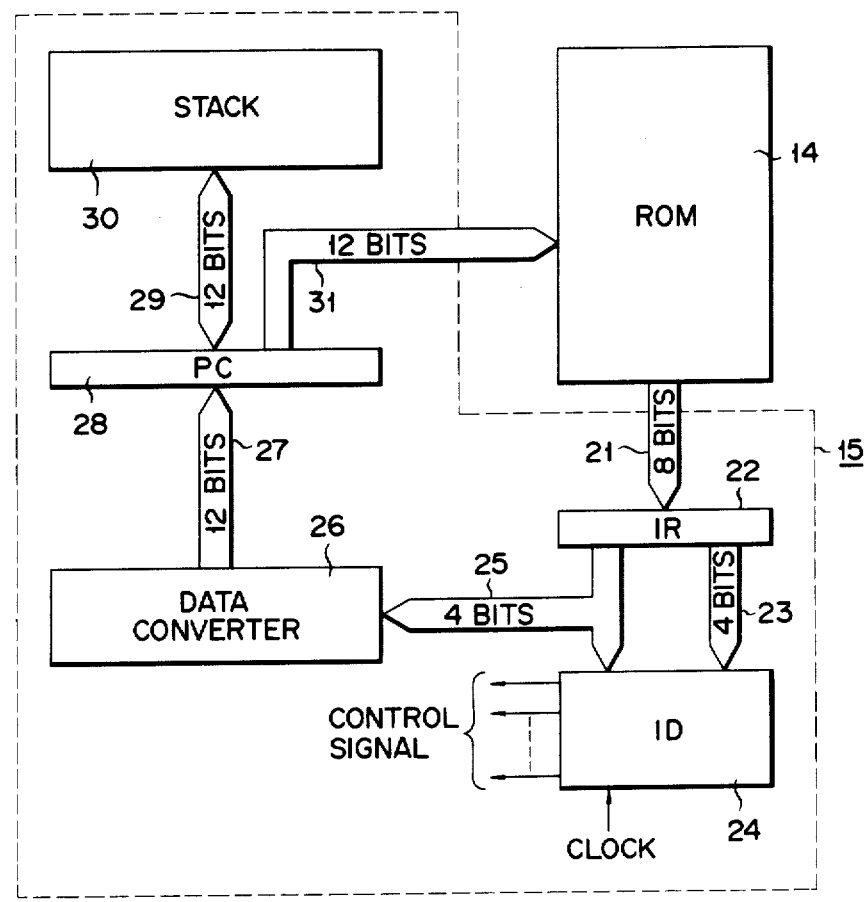

DATA PROCESSING DEVICE USING A SUBROUTINE CALL INSTRUCTION

BACKGROUND OF THE INVENTION

1. Field of the Invention

This invention relates to a data processing device and, more particularly, to an improvement of a program control unit used in a data processing device.

2. Background of the Invention

It is well known that a data processing device (for instance, a microcomputer) performs a program constructed by a series of instructions and processes transaction data. The instruction (or instruction word) is the code stored in the memory. The data processing device fetches the coded instruction from the memory, decodes it and performs some operation. An instruction has a meaning peculiar to the data processing device. The various data processing devices provide instruction species ranging from several tens to several hundreds or more. The data processing device normally has a peculiar word length for each instruction. According to the structure of the data processing device, the basic word length varies from several bits to several tens of bits (or over a hundred bits). The code length (bit length) of most instructions is usually the basic word length, and some instructions are multiples of the basic word length.

A program composed of these various instructions in order to perform one job is called a task. A main program consists of several tasks. Usually, this main program has instruction sequences which may be performed a plurality of times during the processing of one or more tasks. These instruction sequences can be grouped into a common program, which results in savings of memory usage and the simplification of the program. This common program is called a subroutine. This subroutine is performed by instruction for calling subroutine in the above main program. This instruction for calling subroutine is usually called a CALL instruction or a JUMP subroutine instruction (hereinafter referred to as a CALL instruction).

This CALL instruction consists of an operation code field and an operand, and the operation code of the CALL instruction is specified in the above operation code field and the entry point of the subroutine to be called is specified in the operand. In this case, the CALL instruction may be a four word instruction (1 word length=4 bits) or more than words four in length.

In this case, however, there is a disadvantage that the execute time is too long, because the instruction contains too many words. Moreover, the number of program steps which can be stored in a fixed storage region (memory) decreases in proportion to the number of stored CALL instructions. Therefore, there has been a disadvantage in that the memory is not used effectively. Three methods have been devised in order to solve such a disadvantage.

One of them is to define a specific region in the memory (which is located continuously) as the region for subroutine storage. If the address is divided into a low location and a high location, the size of this region is so selected that the high location does not vary in size. For instance, in a case that the above address is represented by 8 bits, if the high order 4 bits represents the high location and the low order 4 bits the low location, the size of the region for subroutine storage is 16 words in length. In this case, since the high location bits are always constant, they can be produced by a proper logic circuit. Accordingly, in the operand forming the CALL instruction, it needs the bits designating only the low location.

The second method is to use a fixed low location and a variable high location. In this case, the subroutine storing area is discontinuously assigned to the memory. In this case, it is necessary to designate only the bits comprising the high location by the operand.

A third method is a combination of the first and second methods. The address of the entry point is divided into high, middle and low locations. The bits comprising the high and low locations are fixed and produced by proper logic circuits. The middle location is specified by the operand. For example, when the address is constructed by 8 bits, the upper three bits are assigned to a high location; the lower three bits to the low location; and the middle two bits to the middle location. At this time, the middle two bits are specified by the operand.

In the three methods, the sizes of the storing areas for the subroutine are different one from another. The size of the first method is largest and that of the second method is smallest.

The three methods each enable the CALL instruction to be constructed by one word. In the first method, as the length of one subroutine is longer, the number of the entry points decreases. In this case, it is necessary therefore to jump to the real and effective subroutine area by using a JUMP instruction. Also in the first method, the real and effective subroutine area is separately provided and a plurality of JUMP instructions have designated entry points of the respective subroutines set therein.

In the second method, the entry points of the subroutines are dispersed in the memory and because of this care must be taken when the subroutines are placed in the subroutine specifying regions. That is to say, when a subroutine exceeds the memory capacity of the specifying area, the subroutine overflows. Thus, it must be branched, by using a branch instruction, to another subroutine specifying area or an empty area in the memory. In this case, the main program is interrupted and it is frequently difficult to change the main program.

In the third method, there is no interruption of the main program. However, since the memory capacity from one entry point to the next entry point is small (although it is large in the first method), the use of a subroutine with an excessively large capacity must be avoided in order to prevent the overflow thereof.

SUMMARY OF THE INVENTION

Accordingly, an object of the invention is to provide a data processing device which uses memory efficiently and reduces the execution processing time of a CALL instruction by employing a two-word length instruction (one byte instruction) in which the entry points in the CALL instruction are coded and the code is specified by the operand in the CALL instruction.

In the present invention, subroutines are selected during the program preparing process, for example, when a flow chart is prepared. The entry points of these subroutines are coded to form a subroutine call instruction with two words; one for the operand and the other for the operation code. In this example, an ordinary subroutine CALL instruction is constructed by four words with one word comprising 4 bits. However, during assembly by the cross-assembler, if the subroutine CALL instruction to be constructed by two words is defined by using a psuedo instruction, it may be converted into an object code instruction of two words. In the execution of the subroutine CALL instruction of two words with coded entry points, the effective address is restored by using a data converter having previously stored an input code and the effective address corresponding to it.

To achieve the above object, the data processing device according to the invention comprises a read only memory for storing instructions or data; an instruction register connected to the read only memory for registering an instruction outputted from the read only memory; an instruction decoder connected to the instruction register which decodes an instruction registered in the instruction register to produce various control signals; data converting means connected to the instruction register which decodes a subroutine call instruction of one byte registered in the instruction register with the address field coded to produce a given program execution address; a program counter connected to the data converting means for storing the program execution address outputted from the data converting means; and a stack connected to the program counter for saving a return address of the subroutine.

Other objects and features of the invention will be apparent from the following description taken in connection with the accompanying drawings, in which:

BRIEF DESCRIPTION OF THE DRAWINGS

FIG. 2 shows a block diagram of a part of the ROM and the control section shown in FIG. 1;

DETAILED DESCRIPTION OF THE PREFERRED EMBODIMENT

Figure 1:
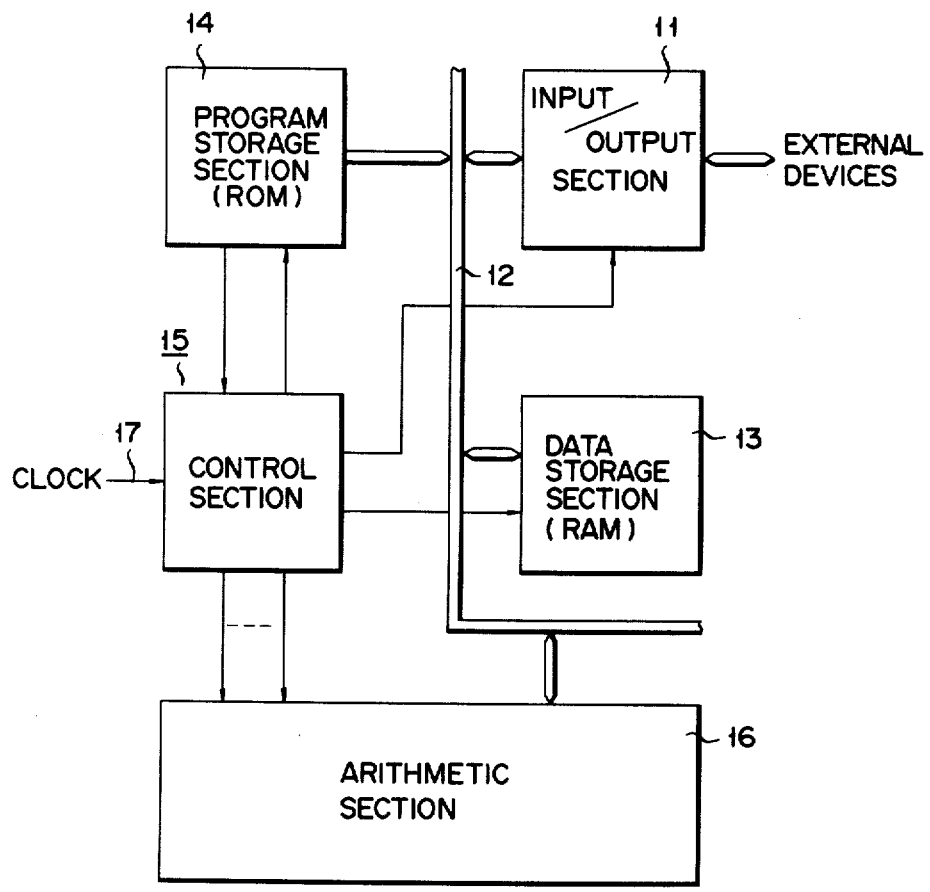
FIG. 1 shows a block diagram of an embodiment of a data processing device according to the invention.

FIG. 1 illustrates the general structure of a microcomputer. In this figure, external devices are connected with an input/output section 11 that controls the data transfer to and from the external devices. The data from the external devices is transferred to a data storage section (random access memory) 13, via the input/output section 11 and a bus 12. The data outputted from the data storage section 13 is transferred to the external devices, via the bus 12 and the input/output section 11.

A program is stored in the program storage section (read only memory) 14. A control section 15, which is connected with the above program storage section 14, controls program specification of execute address, the fetch and so on. The controls by the control section 15 are performed on the basis of a basic clock signal 17.

The arithmetic section 16, which is connected with the control section 15 and the data storage section 13 via the bus 12, executes the program stored in the program storage section 14 to perform arithmetic operations, logical operations and so on on the data stored in the above data storage section 13.

The detailed construction of the microcomputer and instructions used by the same are disclosed in Japan patent application No. 1598/'78, filed by the applicant of the present application.

FIG. 2 shows a block diagram of the control section shown in FIG. 1. An instruction stored in the above program storage section 14 shown in FIG. 1 is loaded into the instruction register 22 which is connected with the output of the program storage section 14 by way of the bus 21 of 8 bits. An instruction stored in the instruction register 22 is decoded by the instruction decoder 24 which is connected to the output of the above instruction register 22 via the bus 23 of 4 bits. As a result, the instruction decoder 24 transfers various control signals to the arithmetic section 16, the input/output section 11 or the data storage section 13 and the like.

The instruction transferred from the above instruction register 22 is applied to a data converter 26 which is connected with the output of the instruction register 22 via the bus 25 of 4 bits. The instruction applied to this data converter 26 is, for example, a two word (1 byte) subroutine call instruction, and the other instruction is not applied by an inhibit signal transferred from the above instruction decoder 24.

The subroutine call instruction of 2 words applied to the data converter 26 is properly processed so that the data converter 26 produces a fixed address, that is, an address of 12 bits. This 12 bit address is supplied to the program counter 28 via the data bus 27 of 12 bits. The program counter 28 is connected with the stack 30 via the data bus 29 of 12 bits, and the contents of the program counter 28, as required, is saved in the stack 30. It is also connected with the ROM 14 via the data bus 31 of 12 bits to transfer the address and to read out the contents of the ROM 14.

Figure 3:
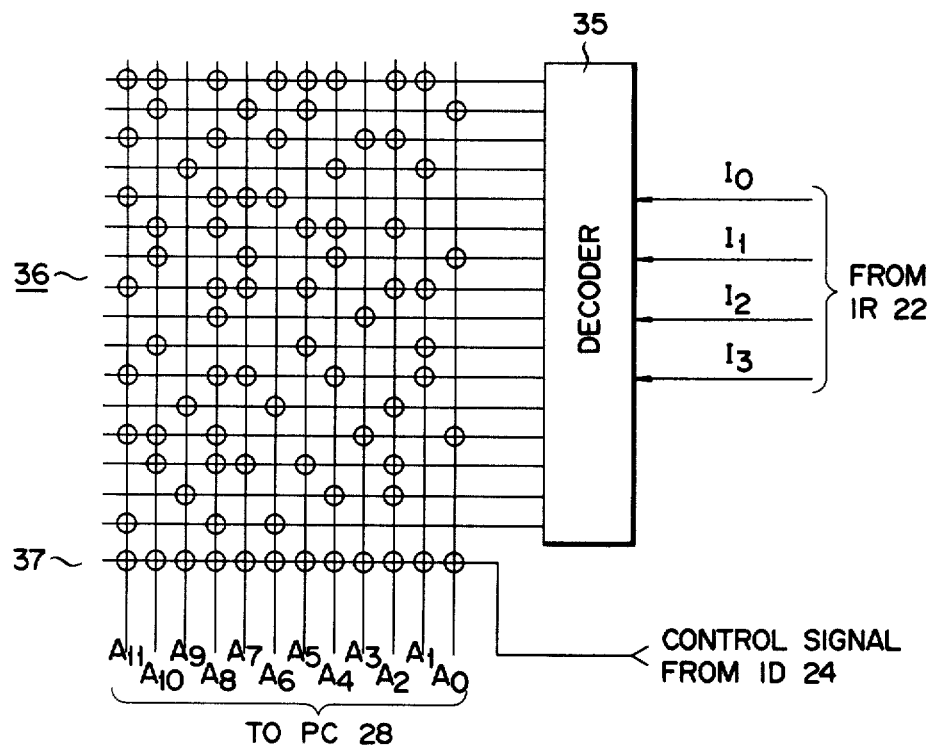
FIG. 3 shows a block diagram of the data converter shown in FIG. 2.

The data converter 26 is comprised of a decoder 35, for example, as shown in FIG. 3. This decoder converts 4 bit data into 12 bit data, and it may be composed of a mask ROM of 12 bits × 16 words. Input data $I_0$ 36, $I_1$ 37, $I_2$ 38 and $I_3$ 39 of 4 bits transferred from the above instruction register 22 are inputted, and 16 variations of 12 bit address values ($A_0$-$A_{15}$) are outputted from the 4 bit input data (code). When an instruction other than the coded subroutine call instruction is applied to the decoder 35, a control signal fed from the instruction decoder (ID) 24 is applied to the output terminal of the decoder 35, preventing the outputting of the address value. The relation between input codes and output values in FIG. 3 is shown in the following table.

TABLE

| Input Code | | | | Address | | | | | | | | | | | |
|---|---|---|---|---|---|---|---|---|---|---|---|---|---|---|---|
| $I_3$ | $I_2$ | $I_1$ | $I_0$ | $A_{11}$ | $A_{10}$ | $A_9$ | $A_8$ | $A_7$ | $A_6$ | $A_5$ | $A_4$ | $A_3$ | $A_2$ | $A_1$ | $A_0$ |
| 0 | 0 | 0 | 0 | 1 | 1 | 0 | 1 | 0 | 1 | 1 | 1 | 0 | 1 | 1 | 0 |
| 0 | 0 | 0 | 1 | 0 | 1 | 0 | 0 | 1 | 0 | 1 | 0 | 0 | 0 | 0 | 1 |
| 0 | 0 | 1 | 0 | 1 | 0 | 0 | 1 | 0 | 1 | 0 | 0 | 1 | 1 | 0 | 0 |
| 0 | 0 | 1 | 1 | 0 | 0 | 1 | 0 | 0 | 0 | 1 | 0 | 0 | 0 | 1 | 0 |
| 0 | 1 | 0 | 0 | 1 | 0 | 0 | 1 | 1 | 1 | 0 | 0 | 0 | 0 | 0 | 0 |
| 0 | 1 | 0 | 1 | 0 | 1 | 0 | 1 | 0 | 0 | 1 | 1 | 0 | 1 | 0 | 0 |
| 0 | 1 | 1 | 0 | 0 | 1 | 0 | 0 | 1 | 0 | 0 | 1 | 0 | 0 | 0 | 1 |
| 0 | 1 | 1 | 1 | 1 | 0 | 0 | 1 | 1 | 0 | 1 | 0 | 0 | 1 | 1 | 0 |
| 1 | 0 | 0 | 0 | 0 | 0 | 0 | 1 | 0 | 0 | 0 | 0 | 1 | 0 | 0 | 0 |
| 1 | 0 | 0 | 1 | 0 | 1 | 0 | 0 | 0 | 0 | 1 | 0 | 0 | 0 | 1 | 0 |

TABLE-continued

| Input Code | | | | Address | | | | | | | | | | | |
|---|---|---|---|---|---|---|---|---|---|---|---|---|---|---|---|
| $I_3$ | $I_2$ | $I_1$ | $I_0$ | $A_{11}$ | $A_{10}$ | $A_9$ | $A_8$ | $A_7$ | $A_6$ | $A_5$ | $A_4$ | $A_3$ | $A_2$ | $A_1$ | $A_0$ |
| 1 | 0 | 1 | 0 | 1 | 0 | 0 | 1 | 1 | 0 | 0 | 1 | 0 | 0 | 1 | 0 |
| 1 | 0 | 1 | 1 | 0 | 0 | 1 | 0 | 0 | 1 | 0 | 0 | 0 | 1 | 0 | 0 |
| 1 | 1 | 0 | 0 | 1 | 1 | 0 | 1 | 0 | 0 | 0 | 0 | 1 | 0 | 0 | 1 |
| 1 | 1 | 0 | 1 | 0 | 1 | 0 | 1 | 1 | 0 | 1 | 0 | 0 | 1 | 0 | 0 |
| 1 | 1 | 1 | 0 | 0 | 1 | 0 | 0 | 0 | 0 | 0 | 1 | 0 | 1 | 0 | 0 |
| 1 | 1 | 1 | 1 | 0 | 0 | 1 | 0 | 1 | 0 | 0 | 0 | 0 | 0 | 0 | 0 |

Figure 4:
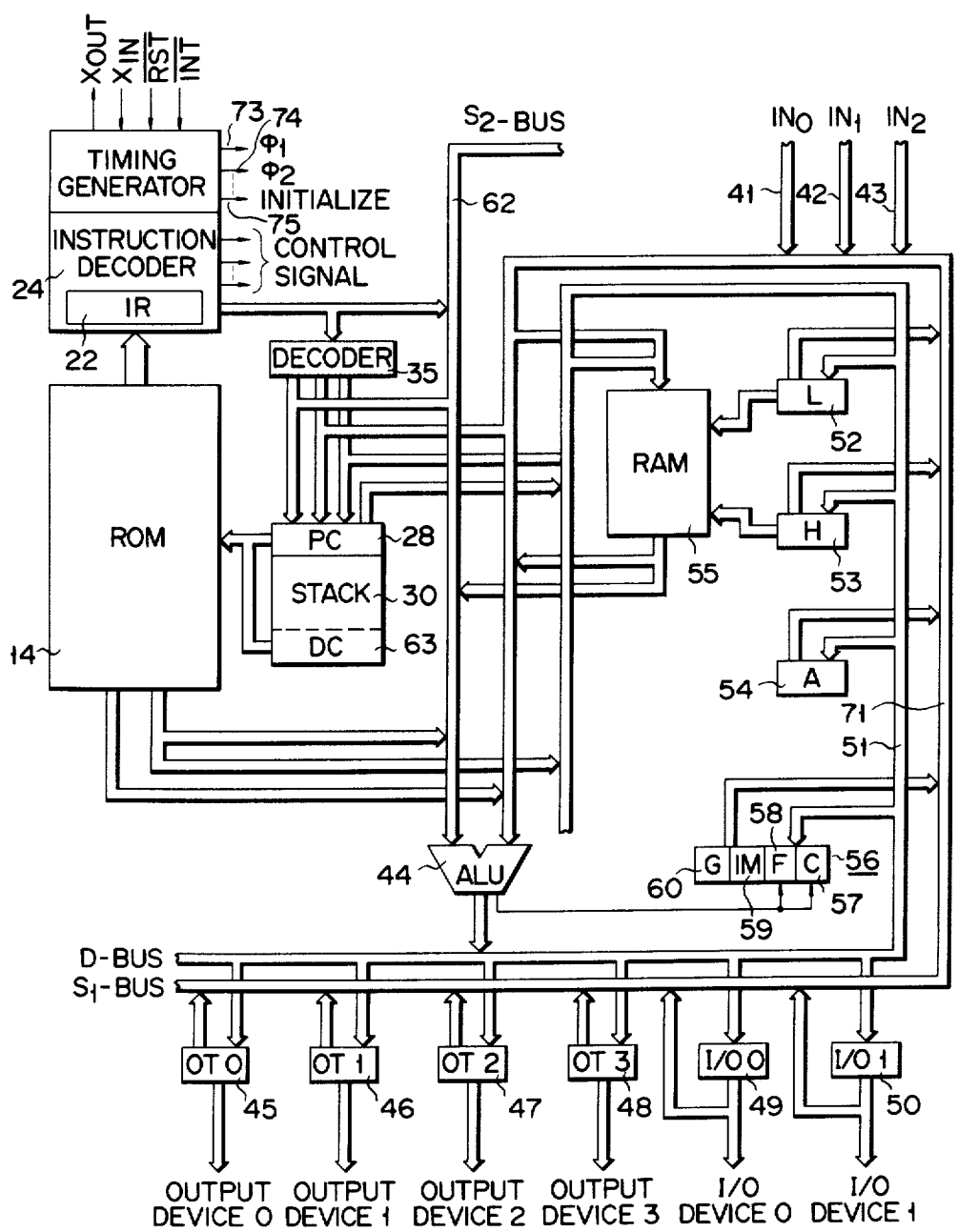
FIG. 4 shows a block diagram of the data processing device according to the invention.

An illustration of the overall data processing device according to the invention is as shown in FIG. 4. In the figure, like numerals are used to designate like portions in FIG. 2 and FIG. 3.

In FIG. 4, the input data 41, 42 and 43 transferred from external devices (not shown) are sent to the arithmetic logic unit (ALU) 44 via a source bus (S1-BUS) 71. Then output devices $OT_0$ 45, $OT_1$ 46, $OT_2$ 47, and $OT_3$ 48, and input/output devices $I/O_0$ 49, $I/O_1$ 50 which are connected with the destination bus receive the results of operations from the ALU 44. In addition each output device, $OT_0$ to $OT_3$, includes a latch circuit. When the output device is read out, the contents read is latched in the latch circuit of the output device. On the other hand, when $I/O_0$ 49 or $I/O_1$ 50 are read out, the value on a data line is read out.

The source bus (S1-BUS) 71 and the destination bus (D-BUS) 51, respectively are connected with a L register 52 for holding the low order bits of a location in the random access memory 55, a H register 53 for hold the high order bits of a location in RAM 55, and to an accumulator 54 which is used to execute operations. Moreover, the register 56, which holds control signals and flag bits for some operation results, is connected to the ALU 44, the source bus 71 and destination bus 51.

The register 56 is comprised of a bit C 57, a bit F 58, a bit IM 59 and a general bit G 60, with the bit C 57 used for executing an add with carry, for instance, the bit F 58 representing the status of a sign flag, a zero flag and a carry flag as a result of arithmetic or logical operations, the bit IM 59 used for an interrupt mask and the general bit G 60 for holding a program status and so on.

An instruction read out from the read only memory (ROM) 14 is added to the instruction decoder via the instruction register (IR) 22. Also, the data transferred from the IR 22 is applied to the decoder 35. This decoder 35 decodes a subroutine call instruction of 2 words in length.

As a result, the execute address of the instruction succeeding a subroutine call instruction is stored in the stack 30, and the start address of the subroutine is applied to the program counter 28.

The data counter 63 which is provided in a part of this stack controls the location address where the constant data such as the conversion table is stored in the ROM 14. The ROM 14 is accessed according to the address transferred from the program counter 28, and the subroutine is executed.

A subroutine call instruction of 4 words (2 bytes) is applied to the above program counter 28 via the second source bus (S2-BUS) 62. Even though it is applied to the decoder 35, the decoder 35 does not produces the address value in response to the control signal transferred from the ID 24.

The timing generator 72 generates basic clock signals 73, 74, an initialize signal 75 and the like. In response to the clock signal $\phi_1$, an instruction is fetched and decoded, and in response to a clock signal $\phi_2$, the instruction is executed.

In the data processing device thus constructed, if the contents of the instruction stored in the location which is specified by the address in the program counter 28 is the instruction which calls one of the 16 selected subroutines, when the upper 4 bits is decoded by the instruction decoder 24, then the control signal corresponding to the call instruction is transferred from the instruction decoder 24. The lower 4 bits of the CALL instruction in the instruction register 22 drive one of 16 drive lines of the cell array 36 by the decoder 35. Then, the cell array 36 loads the selected entry address into the program counter 28 at the instant that the transmission gate opens. The contents thus loaded designates a specific entry address of the subroutine in the program storage section 14. The subroutine is then executed.

Before the entry address is loaded from the data converter 26 to the program counter 28, the former program address (return address) which has been saved from the program counter 28 to the stack 30 is reloaded to program counter by a return instruction, after the execution of the above subroutine.

The data processing device according to the invention uses the subroutine call instruction with two words length (one byte). Further, the entry point is decoded by hardware (data converter 26). For this, the execution time of a program is reduced. Additionally, since the subroutine call instruction is one byte, it is possible to use the program storing area of the memory effectively. Unlike the conventional system, the entry address is not fixed and the program area may also be effectively used. Also unlike the conventional system, the address may be expressed by using all bits in the program counter. That is to say, none the bits of the program counter are used to specify the address. For this, the entry point condition of the subroutine or the length thereof is not taken into consideration.

When a pseudo-instruction such as one to define a subroutine call instruction of two words (one byte) is assembled into an assembler or compiler, a programmer can prepare a program by not taking account of the relation between a program and its addresses, thereby improving program development.

What is claimed is:

1. A data processing device for executing a subroutine CALL instruction to CALL a subroutine, the CALL instruction including an operation code and a memory address to alter the sequence of program execution by setting a program counter of predetermined bit length to the address included in the CALL instruction, said data processing device comprising:
   an assembler for converting said operation code and said memory address into object code;
   a read only memory for storing instructions or data, said read only memory for selectively outputting said stored instructions or data;

an instruction register connected to said read only memory for storing one of said instructions outputted from said read only memory;

an instruction decoder connected to said instruction register for decoding said instruction stored in said instruction register to produce corresponding control signals;

data converting means connected to said instruction register and said assembler for receiving said object code from said assembler and for converting said object code into an address with a bit length corresponding to said predetermined bit length of said program counter, said program counter being connected to said data converting means for storing said converted address; and a stack connected to said program counter for storing a return address of said called subroutine.

2. A data processing device according to claim 1, in which said data converting means comprises a mask ROM.

3. In a data processing device comprising:

a program storing section for storing programs comprising instructions including a subroutine CALL instruction and for selectively outputting said instructions;

an input/output section;

an input/output unit;

a first bus coupled to said input/output section and to said input/output unit for bidirectionally transferring information between said input/output section and said input/output unit, said input/output section for controlling the transfer of data on said bus;

a data memory section connected to said input/output section via a second bus for storing data bidirectionally transferred between said input/output section and said input/output unit;

control means connected to said program storing section, said data storing section, and said input/output section for decoding an instruction outputted from said program storing section to control said program storing section, said input/output section, and said data memory section;

an operational section connected to said control means and said data storing section for performing arithmetic and logic operations in response to said control means, the improvement comprising said control means including:

an instruction register connected to said program storing section for storing an instruction outputted from said program storing section said stored instruction including an address field for storing a coded address;

an instruction decoder connected to said instruction register for decoding an instruction stored in said instruction register and for outputting said decoded instruction;

data converting means connected to said instruction register for receiving said decoded instruction and for converting the said address in the address field of a received decoded instruction into an effective address;

a program counter connected to said data converting means and said program storing section for storing said effective address to indicate the location wherein an instruction stored in said instruction register is stored in said program storing section; and a stack connected to said program counter for storing the return address of a subroutine call instruction when an instruction outputted from said instruction register is a said subroutine CALL instruction.

4. A data processing device according to claim 3, in which said data converting means includes a mask ROM.

5. A data processing device according to claim 4, in which an instruction with an address field to be inputted to said data converting means is a subroutine call instruction.

6. A data processing device comprising:

a read only memory for storing a program portion including subroutine CALL instructions and other instructions, said read only memory for selectively outputting said instructions;

an instruction register connected to said read only memory for storing an instruction outputted from said read only memory said stored instruction including an address field storing a coded address;

an instruction decoder connected to said instruction register for decoding an instruction outputted from said instruction register to produce corresponding control data;

decoder means connected to said instruction register for receiving said coded address of the address field of an instruction stored in said instruction register;

a program counter connected to said decoder means and said instruction register for storing the address of a location stored in said read only memory;

a stack connected to said program counter for storing the return address of a subroutine call instruction when an instruction from said instruction register is a said subroutine CALL instruction;

an arithmetic/logic unit;

a source bus connecting said arithmetic/logic unit to said read only memory and said instruction decoder, said arithmetic/logic unit for performing arithmetic operations and logic operations in response to said control data produced by said instruction decoder;

a destination bus;

a random access memory for storing data, said random access memory being connected to said read only memory, said instruction decoder, and said arithmetic/logic unit;

a first register and a second register, said first register and said second register each connected to said source bus, said destination bus, and said random access memory, said first register and said second register for storing selected addresses in said random access memory;

an accumulator connected to said source bus and said destination bus for use during said arithmetic operations and said logic operations;

a register group for representing the results of said arithmetic operations and said logic operations, said register group being connected to said source bus, said destination bus and said arithmetic/logic unit; and an input/output control unit connected to said source bus and said destination bus for controlling data to be inputted to said source bus.

7. A data processing device according to claim 6, in which said decoder means includes a mask ROM.

8. A data processing device according to claim 6, in which an instruction with an address field to be inputted to said decoder means is a subroutine call instruction.

* * * * *